US008892257B2

(12) United States Patent
Roh (10) Patent No.: US 8,892,257 B2
(45) Date of Patent: Nov. 18, 2014

(54) WALKING ROBOT AND METHOD OF CONTROLLING THE SAME

(75) Inventor: Chang Hyun Roh, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 477 days.

(21) Appl. No.: 12/654,071

(22) Filed: Dec. 9, 2009

(65) Prior Publication Data

US 2010/0168917 A1 Jul. 1, 2010

(30) Foreign Application Priority Data

Dec. 30, 2008 (KR) .......................... 10-2008-136452

(51) Int. Cl.
*G05B 15/00* (2006.01)
*B62D 57/02* (2006.01)
*B62D 57/032* (2006.01)
*B25J 13/08* (2006.01)
*B25J 9/00* (2006.01)
*B25J 13/00* (2006.01)

(52) U.S. Cl.
CPC ............. *B62D 57/032* (2013.01); *B25J 13/085* (2013.01); *Y10S 901/01* (2013.01)
USPC ................. 700/258; 700/260; 901/1

(58) Field of Classification Search
CPC ............................ B62D 57/032; B25J 13/085
USPC ....................................... 700/245–264; 901/1
See application file for complete search history.

(56) References Cited

U.S. PATENT DOCUMENTS

| 5,349,277 | A | * | 9/1994 | Takahashi et al. ........ 318/568.12 |
| 5,455,497 | A | * | 10/1995 | Hirose et al. ............. 318/568.12 |
| 2005/0126833 | A1 | * | 6/2005 | Takenaka et al. ............. 180/8.1 |
| 2005/0151497 | A1 | * | 7/2005 | Nagasaka ................. 318/568.12 |
| 2008/0297091 | A1 | * | 12/2008 | Park et al. ................. 318/568.12 |
| 2009/0308668 | A1 | * | 12/2009 | Roh et al. ........................ 180/8.6 |
| 2010/0114329 | A1 | * | 5/2010 | Casler et al. ..................... 623/24 |

FOREIGN PATENT DOCUMENTS

JP          05305584 A  * 11/1993  ................ B25J 5/00

* cited by examiner

*Primary Examiner* — Khoi Tran
*Assistant Examiner* — Dale Moyer
(74) *Attorney, Agent, or Firm* — Staas & Halsey LLP (57) ABSTRACT

Disclosed is a method of absorbing an impact generated when a foot of a walking robot lands on the ground to perform the walking of the walking robot. When the foot of the walking robot lands on the ground, an F/T sensor installed on the sole or the ankle of the foot measures external force and the posture of the sole of the foot is adjusted in a direction of complying with the external force, and thus an impact transmitted to the walking robot in landing is absorbed. Further, the posture adjusting speed of the sole of the foot is adjusted according to walking speeds (stopped, walking, running).

11 Claims, 8 Drawing Sheets

WALKING ROBOT AND METHOD OF CONTROLLING THE SAME

CROSS-REFERENCE TO RELATED APPLICATIONS

This application claims the benefit of Korean Patent Application No. 2008-0136452, filed Dec. 30, 2008, in the Korean Intellectual Property Office, the disclosure of which is incorporated herein by reference.

BACKGROUND

1. Field

The present invention relates to a walking robot and a method of controlling the same, and more particularly to a method of absorbing an impact generated when a foot of the walking robot lands on the ground while walking.

2. Description of the Related Art

In general, robots are machines, which conduct motions similar to those of a human being using an electrical or magnetic action. Early robots were industrial robots, such as manipulators or transfer robots, for work automation and unmanned operation in a production field, which perform dangerous jobs, simple repetitive jobs, or jobs requiring large forces. Recently, biped walking robots (hereinafter, referred to as walking robots), which have a joint system similar to that of a human being, live together with the human being in human working and living spaces, and walk with two feet, have been vigorously researched and developed.

A walking robot performs walking through the following process. First, when walking instructions, such as a walking speed, the number of steps, a step width, etc., are given, target positions and directions of both feet (right and left feet) are determined, position and direction trajectories of both feet according to time are generated based on the determined target positions and directions of the feet, and thus a walking pattern is generated. The walking robot performs walking such that positions and direction of both feet are controlled according to the walking pattern. In such a walking robot, both feet alternately land on the ground to walk, and when the foot lands on the ground, an impact is transmitted to the walking robot. In order to absorb the impact, ankle joints of the feet are respectively provided with springs and dampers, and thus an impedance control is performed such that the ankle joints have elastic characteristics. However, in the impedance control, coefficients of the springs and the dampers to adjust control characteristics are not intuitive, and it is necessary to change the coefficients of the springs and the dampers according to various walking motions. Thus, the ankles cannot have proper elastic characteristics for the absorption of the impact.

SUMMARY

Therefore, one aspect of the invention is to provide a method of controlling a walking robot, in which external force applied to the walking robot when a foot of the walking robot lands on the ground is measured and thus a posture of the sole of the foot is adjusted to absorb an impact transmitted to the landing walking robot.

Additional aspects and/or advantages will be set forth in part in the description which follows and, in part, will be apparent from the description, or may be learned by practice of the invention.

The foregoing and/or other aspects of the present invention are achieved by providing a method of controlling a walking robot including measuring a moment of a landing foot of the walking robot; and adjusting a posture of the foot in a direction complying with external force according to the measured moment.

The measurement of the moment of the foot may be achieved by measuring a moment of the sole of the foot, which supports the walking robot on the ground.

The adjustment of the posture of the foot may be achieved by moving the sole of the foot in a direction complying with external force in proportion to the moment of the sole of the foot.

The direction of complying with external force may be a direction of absorbing an impact transmitted to the walking robot due to landing.

The method may further include controlling a response characteristic to adjust the posture of the foot.

The method may further include controlling the speed of the response characteristic in real time, and the control of the speed of the response characteristic may be achieved by controlling the posture adjusting speed of the sole of the foot according to the walking speed of the walking robot.

The foregoing and/or other aspects of the present invention may be achieved by providing a walking robot including a plurality of feet, each of the feet including a sole; a plurality of sensors, each of the sensors measuring a moment of a respective one of the feet when the respective foot is landing; and a posture adjusting unit to adjust a posture of the landing foot in a direction of complying with an external force according to the measured moment.

The sensors may be force/torque (F/T) sensors, each of which is installed on the sole of the foot of the walking robot to measure a moment of the sole of the foot, which supports the walking robot on the ground.

The posture adjusting unit may move the sole of the foot in a direction of absorbing an impact transmitted to the walking robot due to landing.

The walking robot may further include a filter to control a response characteristic to adjust the posture of the foot.

The walking robot may further include a speed control unit to control the speed of the response characteristic in real time, and the speed control unit may control a frequency passed through the filter according to the walking speed of the walking robot, and thus control the posture adjusting speed of the sole of the foot.

BRIEF DESCRIPTION OF THE DRAWINGS

These and/or other aspects and advantages of the invention will become apparent and more readily appreciated from the following description of the embodiments, taken in conjunction with the accompanying drawings in which.

DETAILED DESCRIPTION OF EMBODIMENTS

Reference will now be made in detail to the embodiment of the present invention, an example of which is illustrated in the accompanying drawings, wherein like reference numerals refer to like elements throughout. The embodiment is described below to explain the present invention by referring to the annexed drawings.

Figure 1:
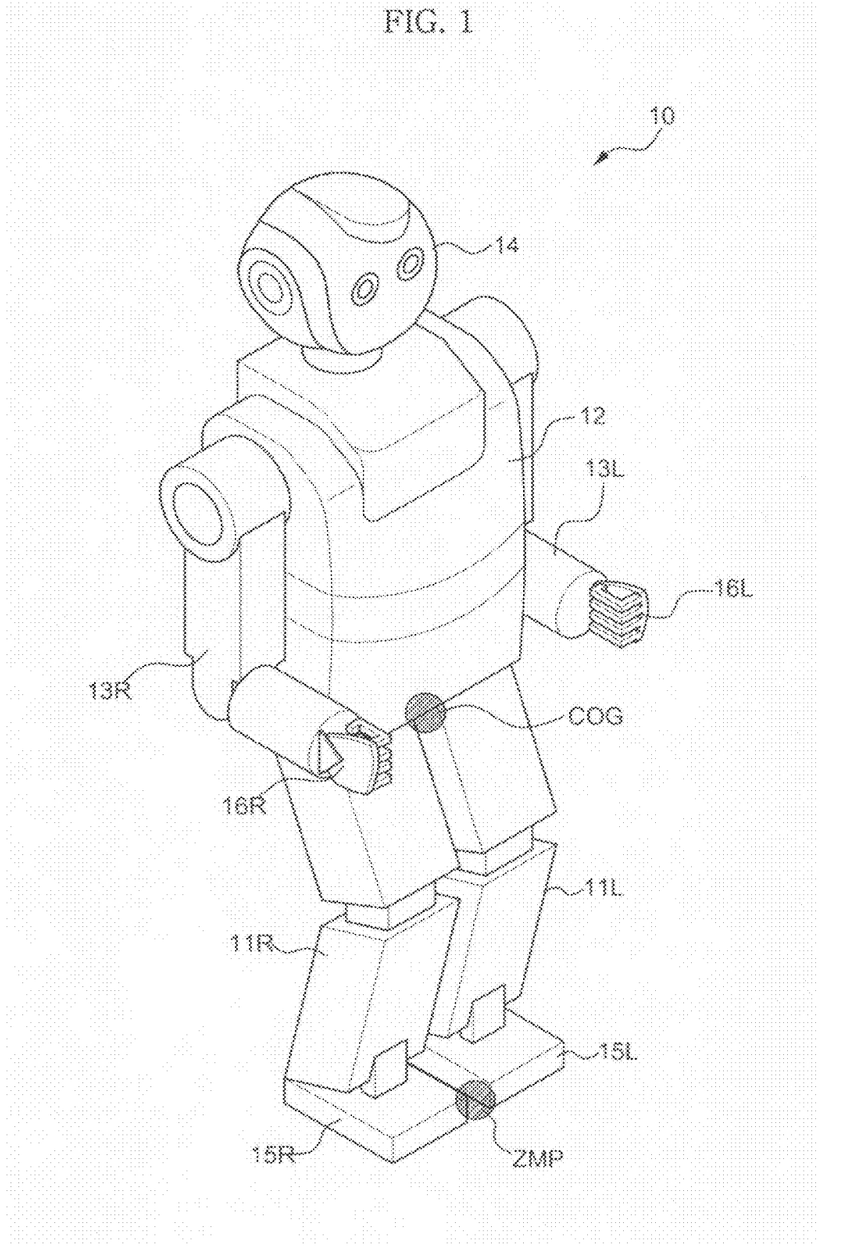
FIG. 1 is a schematic view illustrating the external appearance of a walking robot in accordance with an embodiment of the present invention.

FIG. 1 is a schematic view illustrating the external appearance of a walking robot in accordance with an embodiment of the present invention.

In FIG. 1, a walking robot 10 in accordance with this embodiment is a biped walking robot, which walks upright with two legs 11R and 11L in the same way as a human being, and includes a torso 12, two arms 13R and 13L and a head 14 provided at the upper portion of the torso 12, and feet 15R and 15L and hands 16R and 16L respectively provided at tips of the two legs 11R and 11L and the two arms 13R and 13L.

Here, R represents the right side of the walking robot 10, L represents the left side of the walking robot 10, COG represents the center of gravity of the walking robot 10, and ZMP represents a point on the contact surface between the foot 15R or 15L (particularly, the sole of the foot 15R or 15L) and the ground, where the sum total of the moment in the direction of the X-axis (roll axis), i.e., the walking direction of the walking robot 10, and the moment in the direction of the Y-axis (pitch axis), i.e., the step width direction of the walking robot 10, is zero.

Figure 2:
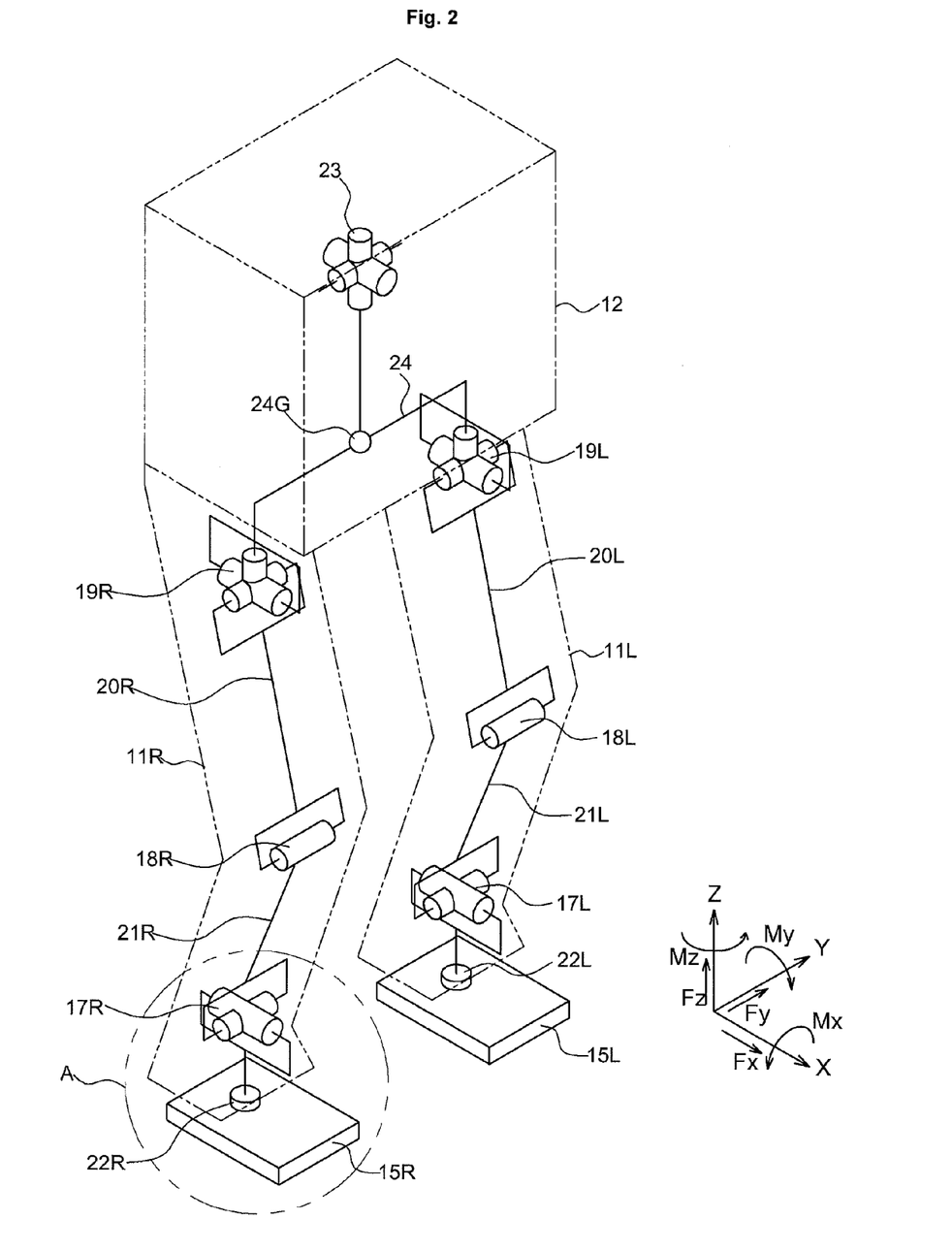
FIG. 2 is a view illustrating structures of main joints of the walking robot of FIG. 1.

FIG. 2 is a view illustrating structures of main joints of the walking robot of FIG. 1.

In FIG. 2, the two legs 11R and 11L respectively include ankle joints 17R and 17L, knee joints 18R and 18L, and hip joints 19R and 19L such that parts of the walking robot 10 corresponding to ankles, knees, and hips are rotatable, and the hip joints 19R and 19L are located at both sides of the lower portion of the torso 12 connected with the two legs 11R and 11L.

The ankle joints 17R and 17L of the respective legs 11R and 11L are movable in the directions of the X-axis (roll axis) and the Y-axis (pitch axis), the knee joints 18R and 18L of the respective legs 11R and 11L are movable in the direction of the Y-axis (pitch axis), and the hip joints 19R and 19L of the respective legs 11R and 11L are movable in the directions of the X-axis (roll axis), the Y-axis (pitch axis), and the Z-axis (yaw axis).

Further, the two legs 11R and 11L respectively include thigh links 20R and 20L connecting the hip joints 19R and 19L and the knee joints 18R and 18L, and calf links 21R and 21L connecting the knee joints 18R and 18L and the ankle joints 17R and 17L, and thus have a designated degree of freedom according to the movements of the respective joints 17R, 17L, 18R, 18L, 19R, and 19L. Force and torque (F/T) sensors 22R and 22L are respectively installed between the feet 15R and 15L and the ankle joints 17R and 17L of the legs 11L and 11R. The F/T sensors 22R and 22L measure three-directional components (Mx, My, Mz) of moment and three-directional components (Fx, Fy, Fz) of force transmitted from the feet 15R and 15L, and provide ZMP data. The ZMP refers to a point on the contact surface between the foot 15R or 15L (particularly, the sole of the foot 15R or 15L) and the ground, where the sum total of the moment in the direction of the X-axis (roll axis) and the moment in the direction of the Y-axis (pitch axis) is zero.

The torso 12 connected with the two legs 11R and 11L includes a waist joint 23 such that a part of the walking robot 10 corresponding to a waist is rotatable, and the waist joint 23 is located coaxially with the position of a center 24G of a hip link 24 connecting the hip joints 19R and 19L located at both sides of the lower portion of the torso 12, i.e., the position of the center of gravity COG of the walking robot 10, and thus is movable in the directions of the X-axis (roll axis), the Y-axis (pitch axis), and the Z-axis (yaw axis).

Figure 4:
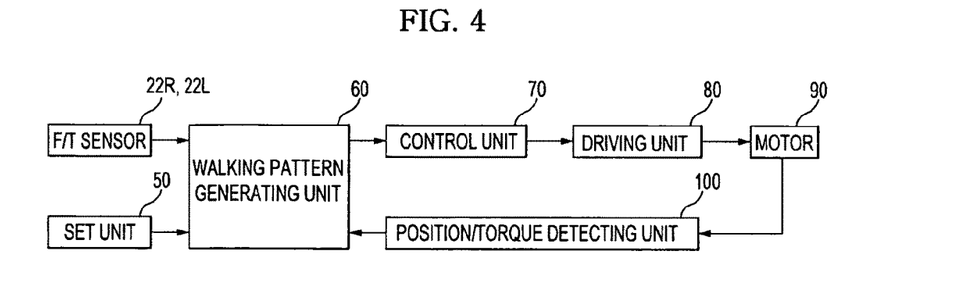
FIG. 4 is a control block diagram of the walking robot in accordance with the embodiment of the present invention.

Each of the joints 17R, 17L, 18R, 18L, 19R, 19L, and 23 of the walking robot 10 includes a motor (for example, a driving device, such as an actuator, as shown in FIG. 4) to drive the corresponding joint.

Figure 3:
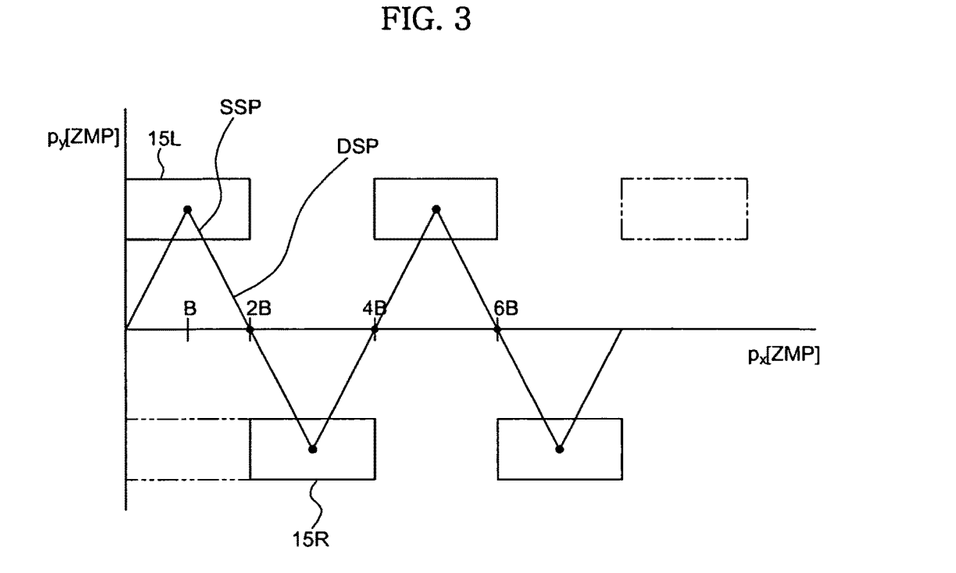
FIG. 3 is a graph illustrating a ZMP trajectory of the walking robot in accordance with the embodiment of the present invention.

FIG. 3 is a graph illustrating a ZMP trajectory of the walking robot in accordance with the embodiment of the present invention. In FIG. 3, the ZMP trajectory of the walking robot 10 in the walking direction (the direction of the X-axis) of the walking robot 10 and the step width direction (the direction of the Y-axis) of the walking robot 10 is expressed on the X-Y plane.

In FIG. 3, B represents the half of the step width.

As shown in FIG. 3, in order to allow the walking robot 10 to perform the stable walking motion, points on the ground, where the sum total of moments is zero, i.e., points (B), on which both feet 15R and 15L will be set, should be predetermined, and a ZMP trajectory to predetermine support phases, such as a double support phase (hereinafter, referred to as a 'DSP') and a single support phase (hereinafter, referred to as a 'SSP') should be set.

The points, on which both feet 15R and 15L will be set, are generally described by a periodic function, and the support phases are used to transfer the ZMP. In the SSP, while a swinging leg makes a step, the ZMP should remain in the sole of a supporting leg. In the DSP, the ZMP should be rapidly transferred from the inside of the sole of the supporting leg to the inside of the sole of the swinging leg. In order to perform the continuous and stable walking of the walking robot 10, the above process needs to be repeated.

FIG. 4 is a control block diagram of the walking robot in accordance with the embodiment of the present invention. The walking robot includes a set unit 50, a walking pattern generating unit 60, a control unit 70, a driving unit 80, motors 90, and a position/torque detecting unit 100.

The set unit 50 sets walking instructions, such as a walking speed, the number of steps, a step width, etc., which are desired according to various walking motions, such that the walking robot 10 can achieve stable walking.

The walking pattern generating unit 60 generates a walking pattern according to the walking instructions, when the walking instructions, such as a walking speed, the number of steps, a step width, etc., which are desired by the walking robot 10, are given. The walking pattern generating unit 60 outputs a phase signal having a designated frequency corresponding to the walking pattern. The outputted phase signal represents walking states of the respective legs 11R and 11L, serves to drive the respective legs 11R and 11L in various walking motions, and is generated in real time during the walking as well as in an initial state of the walking.

The control unit 70 controls the overall operation of the walking robot 10. The control unit 70 calculates a walking trajectory such that the walking robot 10 can achieve stable walking according to the walking pattern generated by the walking pattern generating unit 60, and calculates motor control amounts of the joints 17R, 17L, 18R, 18L, 19R, and 19L of the respective legs 11R and 11L through inverse kinematics.

The driving unit 80 drives the motors 90 such that the joints 17R, 17L, 18R, 18L, 19R, and 19L of the respective legs 11R and 11L move according to the motor control amounts calculated by the control unit 70.

The position/torque detecting unit 100 detects positions and torques of the motors 90, and transmits position/torque data to the walking pattern generating unit 60. The walking pattern generating unit 60 receives the position/torque data of the motors 90 detected by the position/torque detecting unit 100 and thus changes the walking pattern, and receives moment values of the feet 15R and 15L measured by the F/T sensors (22R, 22L) and thus adjusts the posture of the sole of the foot 15R or 15L landing on the ground to relieve an impact applied to the foot 15R or 15L landing on the ground.

Figure 5:
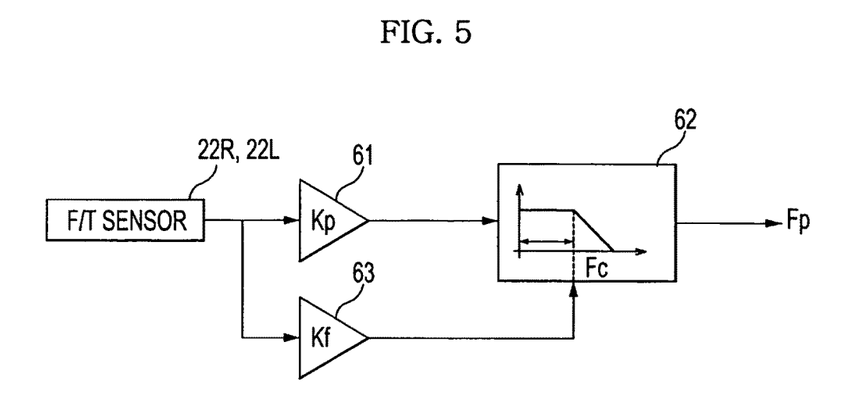
FIG. 5 is a view illustrating the concept of the generation of a control signal to control the landing of the walking robot in accordance with the embodiment of the present invention.

FIG. 5 is a view illustrating the concept of the generation of a control signal to control the landing of the walking robot in accordance with the embodiment of the present invention.

In FIG. 5, in order to control the landing of the walking robot 10 in accordance with this embodiment, values measured by the F/T sensors are used. When the foot 15R or 15L of the walking robot 10 lands on the ground, the F/T sensor 22R or 22L installed on the sole or the ankle of the foot 15R or 15L measures external force and adjusts the posture of the foot 15R or 15L (particularly, the sole of the foot 15R or 15L) in the direction of complying with the external force such that an impact transmitted to the walking robot 10 in landing can be absorbed, and controls posture adjusting speeds of the foot 15R or 15L (particularly, the sole of the foot 15R or 15L) according to a walking speed (for example, stopped, walking, or running) such that the ankle joints 17R or 17L can have elastic characteristics appropriate to the absorption of the impact.

In the control of the landing of the walking robot 10 in accordance with this embodiment, the postures of the soles of the feet 15R and 15L of the walking robot 10 are adjusted based on the moments measured by the F/T sensors 22R and 22L installed on the soles or the ankles of the feet 15R and 15L. The walking robot 10 further includes a posture adjusting unit 61 to adjust the posture of the sole of the foot 15R or 15L in proportion to the moment value measured by the F/T sensor 22R or 22L, a low-pass filter 62 to round the output of the posture adjusting unit 61 to allow the posture of the sole of the foot 15R or 15L to be flexibly adjusted, and a speed control unit 63 to adjust the frequency of the low-pass filter 62 in real time to control the change speed of the output value of the posture adjusting unit 61, i.e., a posture adjusting speed. Thereby, posture control data Fp to adjust the posture of the foot 15R or 15L (particularly, the sole of the foot 15R or 15L) is outputted.

Figure 6A:
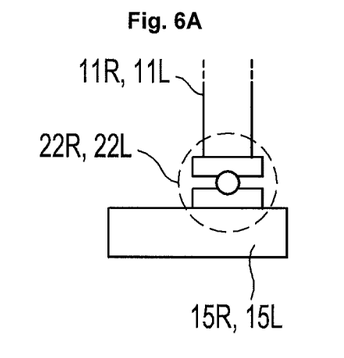
FIGS. 6A to 6C are views respectively illustrating postures of the sole of a foot of the walking robot in accordance with the embodiment of the present invention, adjusted according to external force when the walking robot lands on the ground.
Figure 6B:
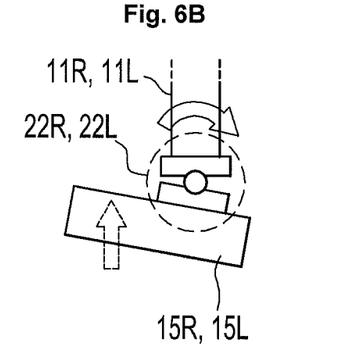
Figure 6C:
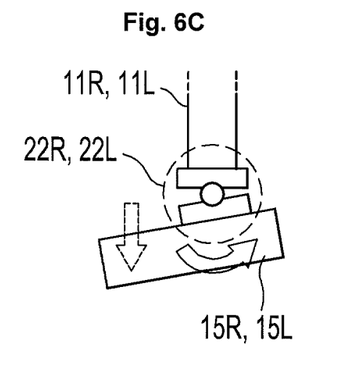

More specifically, the posture adjusting unit 61 receives the moment value measured by the F/T sensor 22R or 22, and adjusts the posture of the foot 15R or 15L (particularly, the sole of the foot 15R or 15L) in proportion to the moment value. The adjustment of the posture of the foot 15R or 15L (particularly, the sole of the foot 15R or 15L) is carried out in the direction of external force applied to the foot 15R or 15L (particularly, the sole of the foot 15R or 15L), as shown in FIGS. 6A to 6C, and the output of the posture adjusting unit 61 passes through the low-pass filter 62. The low-pass filter 62 rounds the output of the posture adjusting unit 61, which is rapidly changed according to the direction of the external force, and thus exhibits a gentle posture adjusting effect.

Here, the speed control unit 63 adjusts the frequency passed through the low-pass filter 62 in proportion to the moment value measured by the F/T sensor 22R or 22L. The frequency passed through the low-pass filter 62 has an output delaying property. That is, using a property that the lower the frequency is, the more slowly the output value is changed, and the higher the frequency is, the more rapidly the output value is changed, the moment value measured by the F/T sensor 22R or 22L is applied to adjust the frequency. Thereby, the adjustment of the posture of the sole is slowly carried out in slow walking, and an impact caused by landing is increased in fast walking and thus the adjustment of the posture of the sole to absorb the impact is rapidly carried out in fast walking. Accordingly, the walking robot 10 has elastic characteristics appropriate to the absorption of the impact caused by landing regardless of various walking speeds, (for example, in case of stopping, walking, running, etc.).

FIGS. 6A to 6C are views respectively illustrating postures of the sole of a foot of the walking robot in accordance with the embodiment of the present invention, adjusted according to external force when the walking robot lands on the ground; and FIG. 6A illustrates the foot of the walking robot 10, in a state in which the sole of the foot contacts the ground. FIGS. 6B and 6C illustrate the foot of the walking robot 10, in states in which the posture of the sole of the foot is adjusted according to the value measured by the F/T sensor 22R or 22L to comply with external force, such that the sole of the foot moves in the direction of the force to offset the effect of the force.

Figure 7:
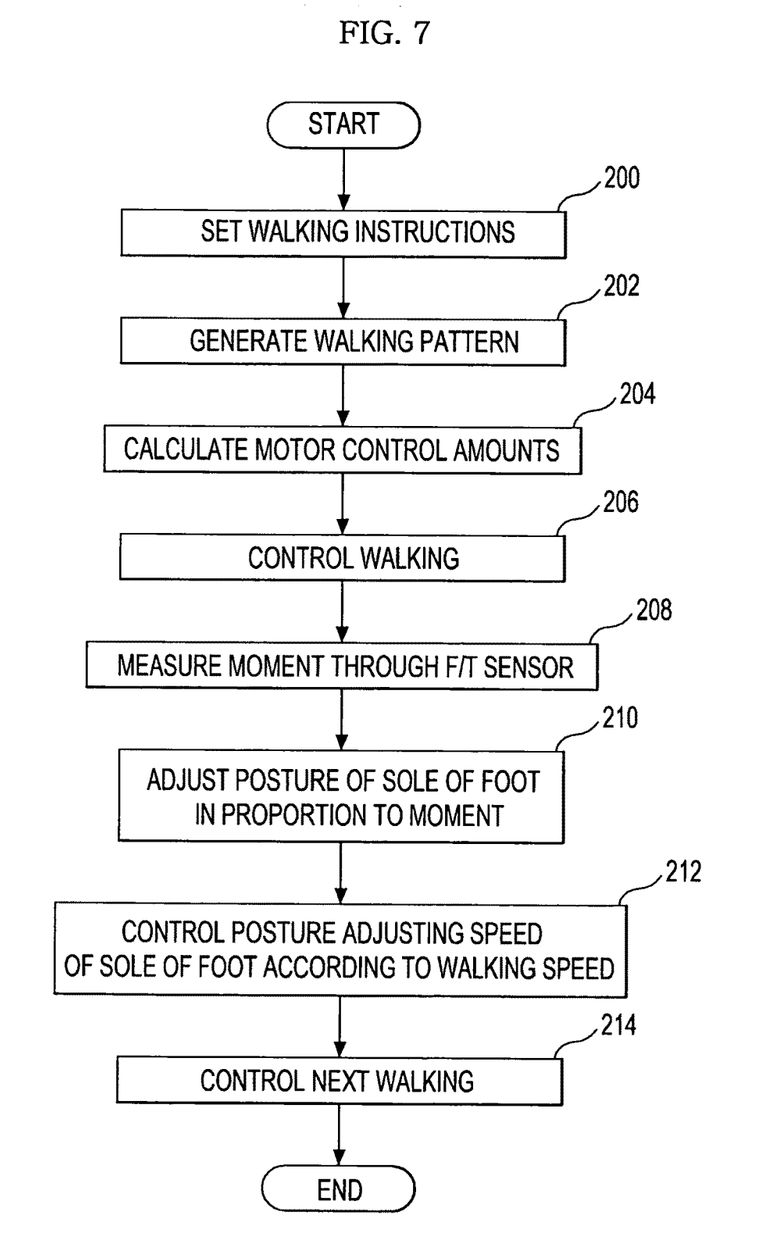
FIG. 7 is a flow chart illustrating a method of controlling the landing of the walking robot in accordance with the embodiment of the present invention.
Figure 8:
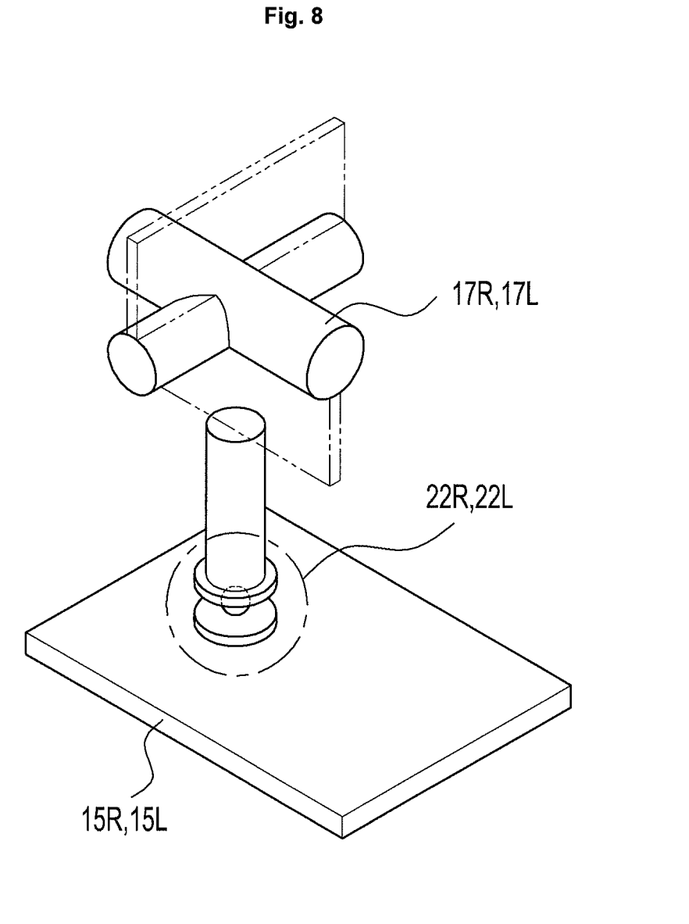
FIG. 8 is a detailed view illustrating a sensor on the foot of the walking robot in accordance with the embodiment of the present invention.

FIG. 7 is a flow chart illustrating a method of controlling the landing of the walking robot in accordance with the embodiment of the present invention.

With reference to FIG. 7, walking instructions, such as a walking speed, the number of steps, a step width of the walking robot 10, etc., are set (operation 200). When the walking instructions are set, the walking pattern generating unit 60 determines desired positions and directions of both feet 15R and 15L, and generates a walking pattern to form position and direction trajectories of both feet 15R and 15L according to time based on the determined positions and directions of the feet 15R and 15L (operation 202).

When the generated walking pattern is transmitted to the control unit 70, the control unit 70 calculates motor control amounts of the joints 17R, 17L, 18R, 18L, 19R, and 19L of the respective legs 11R and 11L through inverse kinematics, and transmits the calculated motor control amounts to the driving unit 80 (operation 204).

Thereafter, the driving unit 80 drives the motors 90 of the respective joints 17R, 17L, 18R, 18L, 19R, and 19L according to the motor control amounts calculated by the control unit 70, and thus controls the positions and directions of both feet 15R and 15L, thereby allowing the walking robot 10 to achieve stable walking (operation 206).

In order to achieve the walking of the walking robot 10, both feet 15R and 15L of the walking robot 10 alternately land on the ground. When the foot 15R or 15L lands on the ground, an impact is transmitted to the walking robot 10. Therefore, in order to measure external force applied to the sole of the foot 15R or 15L when the foot 15R or 15L of the walking robot 10 lands on the ground, the F/T sensor 22R or 22L installed on the sole or the ankle of the foot 15R or 15L measures a moment value (operation 208).

The moment value measured by the F/T sensor 22R or 22L is transmitted to the posture adjusting unit 61 and the speed control unit 63, the posture adjusting unit 61 adjusts the posture of the sole of the foot 15R or 15L in proportion to the value measured by the F/T sensor 22R or 22L (operation 210), and the speed control unit 63 controls the posture adjusting speed of the sole of the foot 15R or 15L according to the walking speed of the walking robot 10 such that the impact transmitted to the walking robot 10 in landing is properly absorbed (operation 212).

Thereafter, the control of the next walking of the walking robot 10 is performed (operation 214).

Although the embodiment of the present invention describes the walking robot 10 performing a stable walking motion using a position-based ZMP control method, the embodiments of the present invention may be applied to a torque-based finite state machine (FSM) control method, in which finite states of the walking robot 10 are defined in advance, and then the finite states of the walking robot 10 are sequentially changed in walking to perform a stable waking motion.

In accordance with one embodiment of the present invention, when a foot of a walking robot lands on the ground, an F/T sensor installed on the sole or the ankle of the foot measures external force and the sole of the foot is adjusted in a direction of complying with the external force, and thus an impact transmitted to the walking robot in landing is absorbed. Further, the posture adjusting speed of the sole of the foot is adjusted according to walking speeds (for example, in case of stop, walking, running, etc.), and thus the walking robot has elastic characteristics appropriate to the absorption of the impact regardless of walking states and achieves a stable walking motion.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of controlling a walking robot, comprising:
    measuring a moment of a landing foot of the walking robot;
    adjusting a posture of the foot in a direction complying with external force according to the measured moment; and
    controlling, by a processor, a posture adjusting speed of the foot according to the measured moment,
    wherein the adjusting of the posture of the foot comprises moving a sole of the foot in a direction complying with the external force in proportion to the measured moment of the foot such that an impact transmitted to the walking robot in the landing of the foot is absorbed.

2. The method according to claim 1, wherein the measuring of the moment of the foot comprises measuring a moment of the sole of the foot, which supports the walking robot on the ground.

3. The method according to claim 2, wherein the adjusting of the posture of the foot comprises moving the sole of the foot in proportion to the measured moment of the sole of the foot.

4. The method according to claim 3, wherein the direction complying with the external force is a direction of absorbing an impact transmitted to the walking robot due to the landing.

5. The method according to claim 3, wherein the adjusting the posture of the foot further comprises controlling a response characteristic.

6. The method according to claim 5, wherein the controlling the response characteristic comprises controlling the speed of the response characteristic in real time,
    wherein the control of the speed of the response characteristic is achieved by controlling the posture adjusting speed of the sole of the foot according to the walking speed of the walking robot.

7. A walking robot comprising:
    a plurality of feet, each of the feet including a sole;
    a plurality of sensors, each of the sensors measuring a moment of a respective one of the feet when the respective foot is landing;
    a posture adjusting unit to adjust a posture of the landing foot in a direction of complying with an external force according to the measured moment; and
    a speed control unit to control a posture adjusting speed of the landing foot according to the measured moment,
    wherein the adjusting of the posture of the foot by the posture adjusting unit comprises moving a sole of the foot in a direction complying with the external force in proportion to the measured moment of the foot such that an impact transmitted to the walking robot in the landing of the foot is absorbed.

8. The walking robot according to claim 7, wherein the sensors are force/torque (F/T) sensors, each of which is installed on the respective sole of the foot to measure a moment of the sole of the foot.

9. The walking robot according to claim 8, wherein the posture adjusting unit moves the sole of the foot in a direction to absorb an impact transmitted to the walking robot due to the landing.

10. The walking robot according to claim 9, further comprising a filter to control a response characteristic to adjust the posture of the landing foot.

11. The walking robot according to claim 10, wherein the speed control unit controls the speed of the response characteristic in real time, and
    wherein the speed control unit controls a frequency passed through the filter according to a walking speed of the walking robot, and thus controls the posture adjusting speed of the sole of the landing foot.

* * * * *